(12) United States Patent
Dupont et al.

(10) Patent No.: US 7,999,229 B2
(45) Date of Patent: Aug. 16, 2011

(54) DEVICE FOR DETECTING AN ELECTROMAGNETIC RADIATION COMPRISING A RESISTIVE IMAGING BOLOMETER, SYSTEM COMPRISING A MATRIX OF SUCH DEVICES AND METHOD FOR READING AN IMAGING BOLOMETER OF SUCH A SYSTEM

(75) Inventors: Benoît Dupont, Bruxelles (BE); Michel Vilain, Saint-Georges des Commiers (FR)

(73) Assignee: ULIS, Veurey Voroize (FR)

( * ) Notice: Subject to any disclaimer, the term of this patent is extended or adjusted under 35 U.S.C. 154(b) by 293 days.

(21) Appl. No.: 12/328,915

(22) Filed: Dec. 5, 2008

(65) Prior Publication Data
US 2009/0152470 A1 Jun. 18, 2009

(30) Foreign Application Priority Data
Dec. 12, 2007 (FR) .................................. 07 59789

(51) Int. Cl.
*G01J 5/00* (2006.01)
(52) U.S. Cl. ................. 250/338.1; 250/339.02; 250/349
(58) Field of Classification Search ............... 250/338.1, 250/339.02, 349
See application file for complete search history.

(56) References Cited

U.S. PATENT DOCUMENTS

| | | | |
|---|---|---|---|
| 6,791,085 B2 | 9/2004 | Martin et al. | |
| 2003/0146383 A1* | 8/2003 | Knauth et al. | ............. 250/338.1 |
| 2003/0160171 A1 | 8/2003 | Parrish et al. | |
| 2004/0200961 A1* | 10/2004 | Parrish et al. | ............. 250/338.1 |
| 2006/0231760 A1 | 10/2006 | Lee et al. | |
| 2009/0014652 A1* | 1/2009 | Chammings et al. | ......... 250/330 |
| 2009/0152465 A1* | 6/2009 | Dupont et al. | ............. 250/338.1 |

FOREIGN PATENT DOCUMENTS
EP   1 211 888 A1   6/2002

OTHER PUBLICATIONS

J. L. Tissot et al, "Uncooled Amorphous Silicon IRFPAs with 25 microns Pixel-Pitch," Electro-Optical and Infrared Systems: Technology and Applications III, Proceedings of SPIE, vol. 6395, 2006, pp. 63950 C-1-C-7.

Yutaka Tanaka et al., "Performance of 320x240 Uncooled Bolometer-Type Infrared Focal Plane Arrays," Infrared Technology and Applications XXIX, Proceedings of SPIE, vol. 5074, 2003, pp. 414-424.

E. Mottin et al., "Uncooled Amorphous Silicon Technology Enhancement for 25 Ξm Pixel Pitch Achievement," Infrared Technology and Applications XXVIII, Proceedings of SPIE, vol. 4820, 2003, pp. 200-207.

* cited by examiner

*Primary Examiner* — David Porta
*Assistant Examiner* — Casey Bryant
(74) *Attorney, Agent, or Firm* — Burr & Brown (57) ABSTRACT

The invention relates to a device for detecting an electromagnetic radiation comprising a resistive imaging bolometer sensitive to the electromagnetic radiation to be detected, intended to be connected electrically to a signal shaping circuit, and a resistive common mode rejection bolometer that is associated electrically with the imaging bolometer, so that the current flowing through the common mode rejection bolometer is subtracted from the current flowing through the imaging bolometer, wherein it comprises means for controlling the resistance of the common mode rejection bolometer by injecting current therein.

10 Claims, 6 Drawing Sheets

DEVICE FOR DETECTING AN ELECTROMAGNETIC RADIATION COMPRISING A RESISTIVE IMAGING BOLOMETER, SYSTEM COMPRISING A MATRIX OF SUCH DEVICES AND METHOD FOR READING AN IMAGING BOLOMETER OF SUCH A SYSTEM

FIELD OF THE INVENTION

The present invention relates to the field of the detection of electromagnetic radiation, and more particularly infrared radiation, based on microbolometric devices.

More particularly, the invention relates to a device for detecting an electromagnetic radiation comprising a resistive imaging bolometer sensitive to the radiation, intended to be connected electrically to a signal shaping circuit, and a resistive common mode rejection bolometer associated electrically with the imaging bolometer so that the current flowing through the common mode rejection bolometer is subtracted from the current flowing through the imaging bolometer.

BACKGROUND OF THE INVENTION

In the field of infrared detectors, it is known to use devices arranged in matrix form, and suitable for operating at ambient temperature, that is, they are not required to be cooled to very low temperatures, contrary to the detection devices called "quantum detectors," which require operation at a very low temperature, typically that of liquid nitrogen.

These uncooled detectors conventionally use the variation in a physical quantity of an appropriate material, as a function of temperature, in the neighborhood of 300 K. In the case of the bolometric detectors, this physical quantity is electrical resistivity.

Such an uncooled detector generally associates:
means for absorbing the infrared radiation and for converting it to heat,
means for thermally insulating the detector, so as to enable it to be heated under the action of the infrared radiation,
thermometer means which, in the context of a bolometric detector, use a resistive element,
and means for reading the electrical signals supplied by the thermometer means.

Detectors for infrared imaging are conventionally made in the form of a matrix of elementary detectors in one or two dimensions, said matrix being formed in a manner called "monolithic" or transferred to a substrate generally made from silicon, in which means for sequentially addressing the elementary detectors are constituted, and means for the electrical excitation and preprocessing of the electrical signals generated by these elementary detectors. This substrate and the integrated means are commonly designated by the term of "read circuit".

To obtain a scene by means of this detector, the scene is projected through an optic adapted to the matrix of elementary detectors, and timed electrical stimuli are applied via the read circuit to each of the elementary detectors, or to each row of such detectors, in order to obtain an electrical signal constituting the image of the temperature reached by each of said elementary detectors. This signal is processed in a more or less elaborate manner by the read circuit, and then optionally by an electronic device outside of the package, in order to generate the thermal image of the scene observed.

The essential difficulty in the use of bolometric detectors resides in the very small relative variation in their electrical resistance, representative of the local temperature variations of an observed scene, compared to the mean value of these resistances.

In fact, the physical laws of thermal emission in the infrared of the scene observed between 8 and 14 μm (corresponding to the transparency band of the earth's atmosphere in which bolometric detectors are commonly used) lead to a differential power dP of about 50 μW/cm² at the detector focal plane when the scene temperature varies by 1 K around 300 K. The determination of this value is easily within the scope of a person skilled in the art, by applying the abovementioned physical laws.

This estimation is valid for an optic with an aperture of f/1, a high transmission between the scene and the detector, and when the detector only receives a negligible quantity of energy outside the specified wavelength band, for example and typically if the package is provided with a window that is transparent in this interval and opaque on either side of the indicated limits.

As a corollary, the temperature variation dT of a bolometer at thermal equilibrium related to the infrared power dP absorbed on its surface S is given by the expression:

$$dT = Rth.dP,$$

where Rth is a thermal resistance between the sensitive part of the bolometer, which is heated under the effect of the infrared radiation, and the isothermal substrate supporting it.

Thus, for a bolometer having typical dimensions of about 30 μm×30 μm, which represents an area of $9.10^{-6}$ cm², the typical thermal resistance according to the prior art is about 20 to 60 MK/W, which leads to a temperature rise of the bolometer of about 0.01 K to 0.03 K when the temperature of the scene element viewed by this bolometer varies by 1 K.

If $R_b$ denotes the electrical resistance viewed between the two current intake poles at the bolometeric sensitive material, the resulting resistance variation $dR_b$ is expressed by the expression:

$$dR_b = TCR.dT$$

where TCR is a coefficient of relative variation of resistance of the material constituting the sensitive part of the bolometer in the neighborhood of the operating temperature, which is conventionally close to −2% per K for commonly used materials in this field (vanadium oxides, amorphous silicon). In consequence, the relative variation in resistance dR/R resulting from a differential of 1 K in the scene is about 0.02 to 0.06%, or $2.10^{-4}$ to $6.10^{-4}$/K.

Today, however, the thermal imaging resolutions demanded are much better than 1 K and typically 0.05 K, or even less. Such results can be obtained by the preparation of structures having very high thermal resistances Rth involving the use of sophisticated techniques. However, the need remains to measure infinitesimal relative variations in resistance and typically, as previously indicated, of about a few $10^{-6}$, to resolve the time-space temperature variations of a few tens of milliKelvin.

Figure 1:
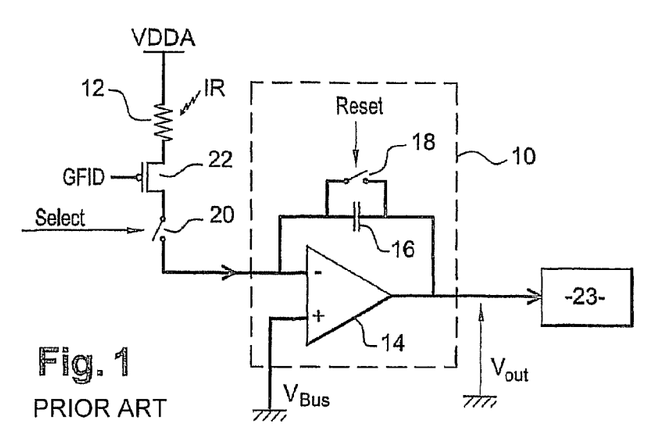
FIG. 1 is a schematic view of a sensitive bolometer and its read device according to the prior art.

In order to clarify the difficulty of using such a small variation, FIG. 1 shows a schematic of a read circuit of a resistive bolometer 12 having a resistance $R_b$, subject to an infrared radiation and connected at one of its terminals to a predefined constant bias voltage $V_{DDA}$. The read circuit comprises an integrator 10 formed from:
an operational amplifier 14 whereof the non-reversing input (+) is set at a predefined constant voltage Vbus;
a capacitor 16, having a predefined capacitance $C_{int}$, connected between the reversing input (−) of the amplifier 14 and the output thereof;

a zero reset switch 18 connected in parallel from the capacitor 16 and controllable by means of the Reset signal.

The read circuit further comprises:
- a first read switch 20 controllable by means of a "Select" signal and connected to the reversing input (−) of the operational amplifier;
- an MOS injection transistor 22, whereof the grid is set at a predefined constant voltage GFID, whereof the source is connected to another terminal of the bolometer 12, and whereof the drain is connected to the other terminal of the first selection switch 20; and
- a data processing unit 23, connected at the output of the operational amplifier 14, and determining, according to the voltage $V_{out}$ at the output thereof, the variation in resistance of the bolometer 12 caused by the infrared radiation received by said bolometer, and hence the infrared radiation.

At the start of a read cycle of the bolometer 12, the zero reset switch 18, which is at the closed state after a discharge cycle of the capacitor 16, is switched to the open state by setting the Reset signal at an appropriate value. The first read switch 20, which is in the opened state, is switched to the closed state by adjusting the "Select" signal. The current flowing through the bolometer 12 is then integrated by the capacitor 16. When a predefined integration time $\Delta T_{int}$ has elapsed since the start of the read cycle, the first read switch 20 is switched to its open state. The voltage $V_{out}$ at the output of this integrator, the image of the resistance $R_b$ of the bolometer, is then given by the expression:

$$V_{out} = \frac{V_{bolo}}{R_b} \times \frac{\Delta T_{int}}{C_{int}}$$

where $V_{bolo}$ is the voltage at the terminals of the bolometer 12, by assuming, for simplification, that $R_b$ varies only slightly during the integration time Tint.

Thus, a matrix of N resistances (bolometers) could be read by this principle using the simultaneous integration (by means of N integrators) or sequential integration (on an integrator placed at the end of the line or end of the column, or even a single integrator for the matrix).

When the matrix thus prepared is lit by the projection of an infrared scene, $V_{out}$ will display spatial variations (issuing from each bolometer) that are representative of the scene. It may be recalled that the voltage $V_{out}$ as previously expressed consists very largely of a constant portion from one detector to the next (signal called "common mode"), which is therefore of no interest in terms of imaging. Only the infinitesimal variations in $V_{out}$ associated with the local differences (between one bolometer and the other) and temporal variation (the scene varies over time) in the optical power received constitute the useful signal of the scene observed.

In fact, the limitations inherent in microelectronic circuits in terms of voltage (a few volts), the accessible and controllable values of the bolometric resistances $R_b$ (a few tens to a few hundred kOhms) and the need to use sufficiently short integration times, would lead to the use of very high capacitances $C_{int}$, in any case incompatible with the area available in each elementary point or detection pixel (about that of a bolometer), and even in practice incompatible with a transfer of this capacitance to the exterior of the surface of the read circuit corresponding to the sensitive matrix, where the area is nevertheless not limited. It is therefore necessary to install read modes which limit the current to be integrated to levels compatible with reasonably obtainable capacitances.

Furthermore, due to the existence of the thermal coupling between the substrate and the bolometer, the thermal variations undergone by the substrate are transferred to the bolometer. Since common bolometers have a very high sensitivity to such variations, the consequence thereof is that the useful output signal is disturbed by this background component, which is harmful to the quality of detection of the infrared radiation.

To overcome these drawbacks, a first resistive structure has been proposed designed to inhibit the common mode current, called "reference" current described in the document "Performance of 320×240 Uncooled Bolometer-type Infrared Focal Plane Arrays" by Yutaka Tanake et al., Proc. SPIE, vol 5074.

The principle of a reference resistive structure is to associate the resistive bolometer 12 in FIG. 1 with a second identical resistive bolometer, polarized and connected to the substrate identically to the first bolometer. This second bolometer is further arranged in order to be essentially insensitive to the stream from the scene, typically by an opaque metal membrane. The first and second resistive bolometers are also associated so that the current flowing through the second bolometer is subtracted from the current flowing to the first bolometer and it is this current difference that is used by the read circuit.

In order to distinguish between the functions of these two bolometers, the expression "imaging" bolometer is used for the first bolometer, and the expression "reference" bolometer is used for the second bolometer, even though in certain applications, thermometry for example, an image is not necessarily formed, but a temperature measurement for example.

Figure 2A:
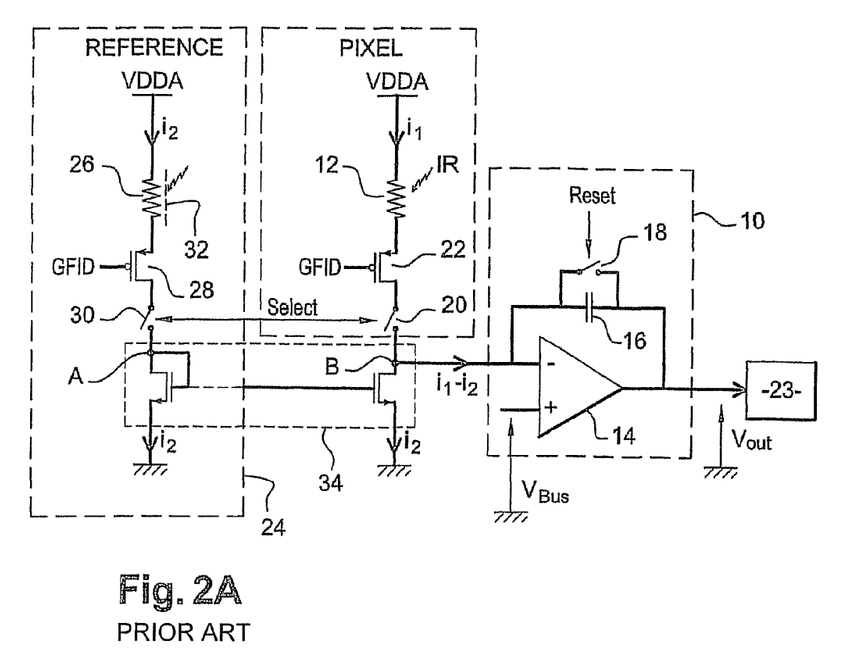
FIG. 2A is a schematic view supplementing FIG. 1 with common mode compensation using a resistive reference structure according to the prior art and associated circuitry elements.

A reference structure 24 is shown schematically in FIG. 2A, which resumes the elements in FIG. 1, with which a circuit called "reference" circuit 24 is associated. The reference circuit 24 comprises a reference bolometer 26, an MOS polarization transistor 28 and a second read switch 30, respectively substantially identical to the imaging bolometer 12, the MOS injection transistor 22 and the first read switch 20.

The elements 26, 28 and 30 are also polarized and arranged in the same manner as the elements 12, 22 and 20, with the only difference that the reference bolometer 26 is provided with an opaque metal membrane 32 protecting it from the radiation issuing from the scene.

The resistive reference structure also comprises a current mirror 34, whereof one input branch is connected to a terminal A of the second read switch 30, and whereof the other input branch is connected to a terminal B of the first read switch 20. This current mirror 34 substantially reproduces the current $i_2$ flowing through the reference bolometer 26 at the terminal B.

The use of current mirrors serves to have a single reference structure per line, the combination of these structures being disposed along a reference "column" for a matrix detector. Current mirrors are structures known to a person skilled in the art. They serve in general to copy a reference current in a distant structure, and in particular, they allow the distribution of this reference current in a multitude of circuitry elements, independently of their resistive charge.

Thus, the current $i_2$ flowing through the reference bolometer is substantially equal to the common mode current, and the reference bolometer is subject to the same thermal variations from the substrate as the imaging bolometer. The difference $i_1 - i_2$ between the current $i_1$ flowing through the imaging bolometer and the current $i_2$ flowing through the reference bolometer is accordingly substantially free of the disturbances, which are the common mode current and the component associated with the thermal variations of the substrate. This current difference $i_1$-$i_2$ therefore corresponds substantially to the current induced by the variation in resistance of the imaging bolometer 12 owing to its heating by the infrared radiation issuing from the scene.

However, a resistive reference structure is technically difficult to produce. In fact, to obtain a satisfactory operation thereof, it is necessary for the metal membrane 32 protecting the reference bolometer to be totally opaque to the stream issuing from the scene, while being thermally insulated from the other elements of the structure to avoid any thermal disturbance on the reference bolometer. It is easy to see that such a membrane is difficult to design and to produce.

To overcome the drawbacks mentioned above, a second resistive structure for inhibiting the common mode current has also been proposed, called "compensation" resistive structure, described in the document "*Uncooled amorphous silicon enhancement for 25 μm pixel pitch achievement*" E Mottin et al, Proc. SPIE, Technology and Application XXVIII, Vol 4820.

Figure 2B:
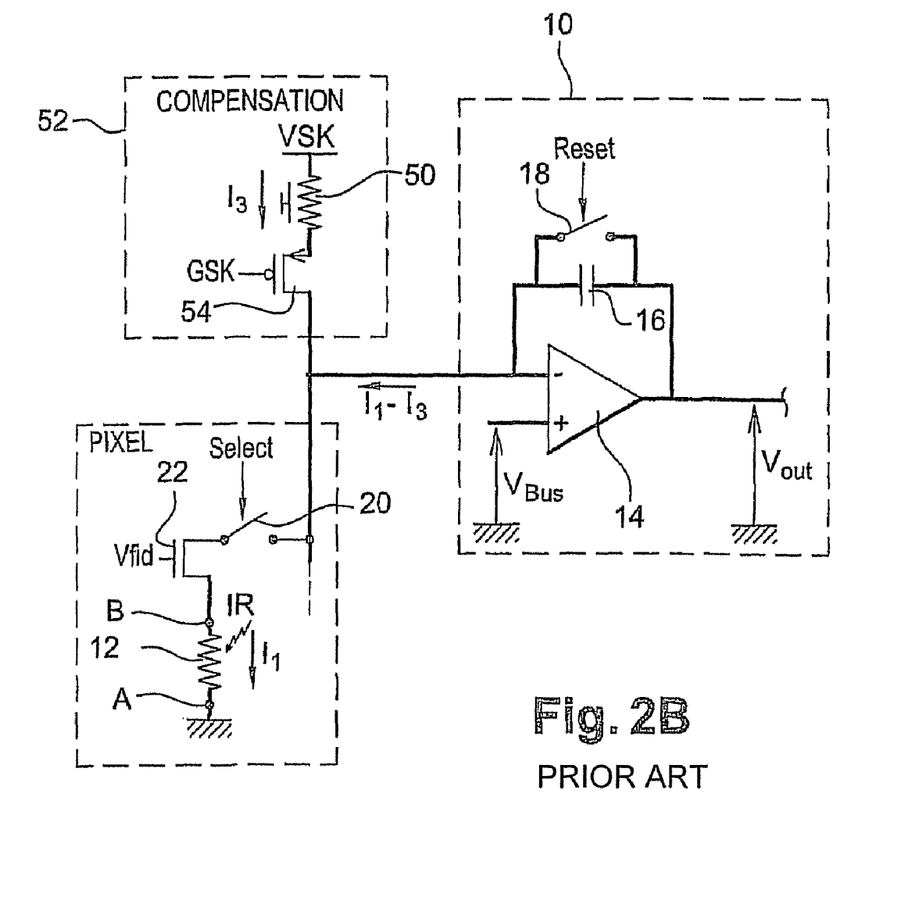
FIG. 2B is a schematic view supplementing FIG. 1 with common mode compensation using a resistive compensation structure according to the prior art and associated circuitry elements.

FIG. 2B schematically shows this compensation structure 52, which comprises a bolometer 50 typically constructed using the same material as the active bolometer 12, but essentially insensitive to the incident radiation due to a thermal resistance which is very weak by construction compared to the substrate, and optionally further provided with an optical shield, and also a transistor 54 for polarization of the bolometer 50. The bolometer called "thermalized" 50 is connected at one of its terminals to a fixed voltage source VSK, and at the other terminal to the source of a transistor 54 whereof the grid is raised to a fixed potential GSK and whereof the drain is connected to the reversing input (−) of the amplifier 14.

The value of the resistance 50 and the polarizations are set so as to produce a common mode current $I_3$ with an intensity comparable to the current $I_1$, which is subtracted from the current $I_1$ at the summation point of the integrator 10, which therefore integrates the current $I_1$-$I_3$.

This structure is effective in terms of common mode rejection if the thermal resistance of the bolometer 50 is very low compared to that of the imaging bolometer 12, typically by a factor of at least about $10^3$, because if not, undesirable contrasts are formed, detrimental to the quality of the image, which are not representative of the scene, particularly when a very warm zone of the scene forms an image on these structures. This result of high thermal conduction may be reached for example by constructing the bolometric elements 50 directly in contact with the substrate.

However, such a construction raises problems that are difficult to control in terms of the available planes of the structures during the technological assembly, and in practice, one is forced to form the bolometers 50 at the same level as the sensitive membranes of the bolometers 12. It follows that a non-zero thermal resistance normally subsists between the element 50 and the substrate, unless complex technological measures are taken, which are detrimental to the manufacturing output and the cost of the detectors thus prepared.

In this case of the application of a reference structure, which is at least useful during the use of a compensation structure, it is therefore necessary to provide an opaque shield of optical desensitization on these common mode rejection structures, whereas the substantial complexification that the preparation of such a membrane implies necessarily entails an additional cost, due to the additional steps in manufacture and the necessarily lower production yield.

SUMMARY OF THE INVENTION

It is the object of the invention to solve the abovementioned problem by proposing a structure having a common mode rejection bolometer that is effectively isolated from the radiation issuing from the scene without using a physical protective shield.

For this purpose, the invention relates to a device for detecting an electromagnetic radiation comprising a resistive imaging bolometer sensitive to the radiation, intended to be connected electrically to a signal shaping circuit, and a resistive common mode rejection bolometer associated electrically with the imaging bolometer so that the current flowing through the common mode rejection bolometer is subtracted from the current flowing through the imaging bolometer.

According to the invention, this device comprises means for controlling the resistance of the common mode rejection bolometer by injecting current therein.

Thus, by using means for controlling the resistance of the common mode rejection bolometer, it is possible to set said resistance at a value independent of the radiation issuing from the scene, and thereby to isolate the common mode rejection bolometer from this radiation by these electrical means.

According to particular embodiments of the invention, the device comprises one or more of the following features.

The means for controlling the resistance of the common mode rejection bolometer comprise means for injecting a predefined reference current therein.

The control means comprise means for disconnecting the current injecting means when a voltage at a terminal of the common mode rejection bolometer is substantially equal to a predefined reference voltage.

The reference voltage is set at a higher value than the voltage at the terminal of the common mode rejection bolometer during an activation of the current injecting means.

The common mode rejection bolometer is a reference bolometer, and it comprises a current mirror suitable for being electrically connected on a first branch to a terminal of the imaging bolometer, and on a second branch to a terminal of the reference bolometer.

The common mode rejection bolometer is a compensation bolometer.

The control means are suitable for fixing the resistance of the common mode rejection bolometer to a reference resistance depending on the temperature of the substrate above which the imaging bolometer is formed.

The imaging bolometer and the common mode rejection bolometer are arranged in a Wheatstone bridge.

The invention also relates to a system for detecting an electromagnetic radiation comprising a matrix of at least one line of devices each comprising a resistive imaging bolometer sensitive to the radiation and a resistive common mode rejection bolometer associated electrically with the imaging bolometer so that a current flowing through the common mode rejection bolometer is subtracted from a current flowing through the imaging bolometer. It also comprises a signal shaping circuit suitable for being connected electrically to the imaging bolometer for a reading of the variation in resistance thereof. The detection devices of this system are of the abovementioned type.

According to particular embodiments of the invention, the system comprises one or more of the following features.

The means for controlling the resistance of the common mode rejection bolometer are suitable for adjusting its resistance to a value independent of the scene.

The signal shaping circuit is suitable for being initialized before a reading of the imaging bolometer, and in that the means for controlling the resistance of the common mode rejection bolometer are suitable for adjusting said resistance during the initialization of the integration circuit.

The invention also relates to a method for reading a variation in resistance of a resistive imaging bolometer of a matrix of bolometers constituting a system for detecting the electromagnetic radiation.

This method consists in:
circulating a common mode current of the matrix in a common mode rejection bolometer,
generating a current difference between the currents flowing in the imaging bolometers and the common mode rejection bolometers,
shaping the signal relative to an imaging bolometer according to the current difference.

According to the invention, prior to the step of circulating the common mode current in the common mode rejection bolometer, an adjustment is made to the resistance of the common mode rejection bolometer at a value lower than that of all these bolometers when they are exposed to a scene having a temperature close to the upper limit of a predefined scene dynamic.

BRIEF DESCRIPTION OF THE DRAWINGS

The invention will be better understood from a reading of the description that follows, provided exclusively as an example, and in conjunction with the appended drawings, in which identical reference numerals identify identical or similar elements, and in which.

DETAILED DESCRIPTION OF THE INVENTION

A resistive reference structure according to the invention is arranged in a bolometric detector which comprises:
a unidimensional or bidimensional imaging matrix of imaging bolometers arranged in the focal plane of an optic transparent to infrared,
a read circuit formed in a substrate under the surface of the matrix and comprising means for line by line addressing and column by column integration of the matrix;
a one or more common mode compensation bolometers disposed in each line or alternatively, each column of the imaging matrix, but beyond the sensitive zone forming the image for the imaging applications.

Such an arrangement of bolometric detectors is conventional and is not explained in greater detail below. For further information, reference can be made for example, for the application of the reference bolometers disposed at the end of line, to the document "*Performance of* 320×240 *Uncooled Bolometer-type Infrared Focal Plane Arrays*" by Yutaka Tanake et al, Proc. SPIE, vol 5074, and for the application of compensation bolometers disposed at the end of column, to the document "*Uncooled amorphous silicon enhancement for* 25 μm *pixel pitch achievement*" by E. Mottin et al, Proc. SPIE Technology and Application XXVIII, Vol 4820.

Figure 5A:
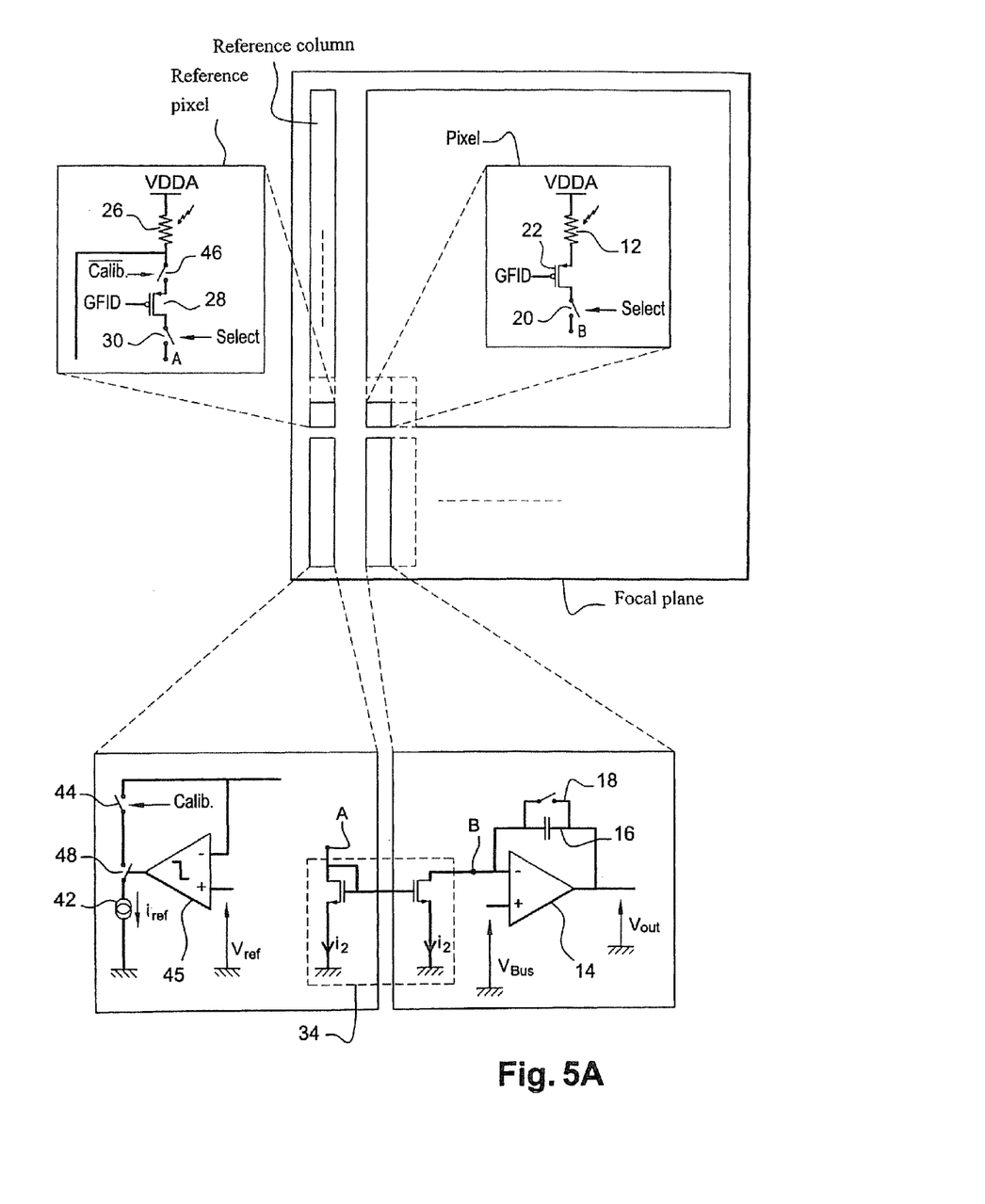
FIG. 5A is a schematic view of a bolometric detector according to the invention using reference structures.

In relation to FIGS. 3A and 5A, a first preferred arrangement will now be explained of an imaging bolometer, a read circuit thereof and a common mode rejection bolometer according to the invention, of the type called "reference".

Figure 3A:
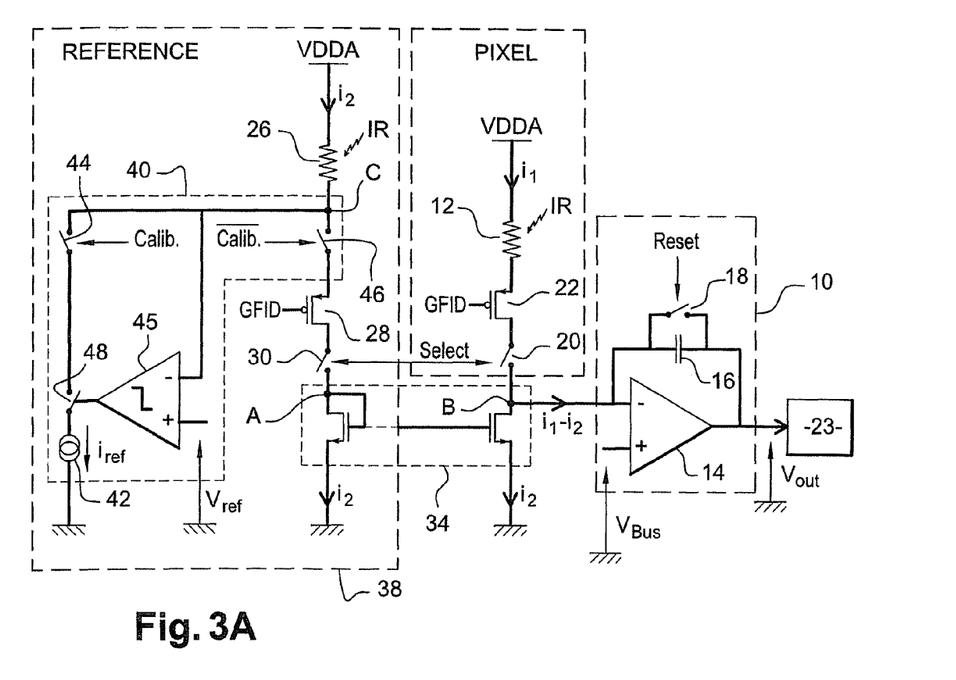
FIG. 3A is a schematic representation supplementing FIG. 2A with common mode compensation using the resistive reference structure according to the invention.

As shown in FIG. 3A, a reference structure according to the invention comprises a reference column 38 in which, instead of the protective metal membrane, desensitizing the reference bolometer against the radiation of the prior art shown in FIG. 2A, a circuit 40 is provided for controlling the resistance of the reference bolometer 26.

It may therefore be observed that the reference bolometer 26 may be subject to infrared radiation issuing from the scene in the same way as the imaging bolometer 12.

The control circuit 40 comprises a constant current source 42, connected to a terminal C of the reference bolometer 26 via a first calibration switch 44 controllable by a Calib signal. The current source 42 injects into the reference bolometer 26 a current of predefined intensity $I_{ref}$ when the first calibration switch 44 is in its closed state.

The control circuit 40 also comprises a second calibration switch 46, controllable by means of a Calib signal, which is a complementary signal to the Calib signal. This second calibration switch is arranged between a terminal C of the bolometer and the source of the MOS transistor 28.

The circuit 40 further comprises a comparator 45, which compares a voltage $V_C$ of the terminal C of the reference bolometer 26 to a predefined reference voltage $V_{ref}$.

Finally, a third switch 48, controlled by an output signal of the comparator 45, is arranged between the current source 42 and the reference bolometer 26. More particularly, the comparator 45 maintains the third switch 48 in its closed state when the voltage $V_{ref}$ is higher than the voltage $V_C$ at the terminal C, and switches the third switch 48 to its open state when the voltage $V_{ref}$ is substantially equal to the voltage $V_C$.

A bolometeric detector comprising an imaging matrix, read by a read circuit with common mode current rejection from reference structures comprising the elements described above, is shown in FIG. 5A.

Figure 4:
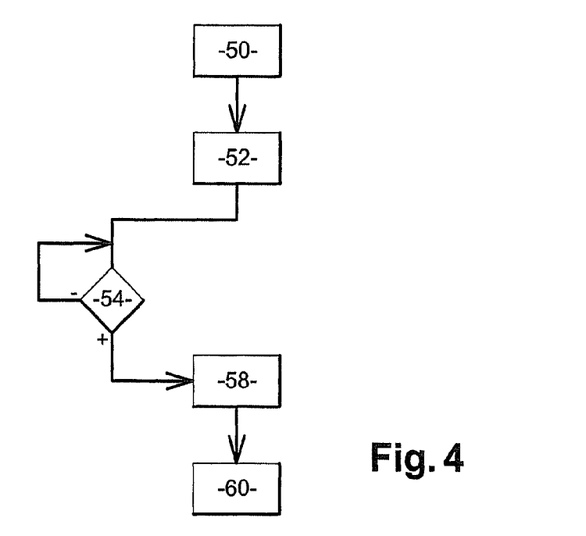
FIG. 4 is a flow chart of a method for reading an imaging bolometer using the circuitry shown schematically in FIGS. 3A and 3B.

A method for reading the sensitive bolometer 12 used by the control circuit 40 will now be described in relation to FIG. 4.

A first step of this method is an initialization step 50. The step 50 consists in particular in selecting a value for the current $I_{ref}$ and a value for the voltage $V_{ref}$, in a manner that is explained in greater detail below.

A step 52 of preheating the reference bolometer 26 at a constant current $I_{ref}$ and of initialization of the integrator 10 is then triggered by the closure of the "Reset" switch 18. The term "preheating" is used here to mean that there is an additional cycle necessary with regard to the operation of the prior art that is implemented before a conventional read cycle of the imaging bolometer 12. This additional cycle consists in raising the temperature of the reference bolometer 26 to a particular value depending on the values $I_{ref}$ and $V_{ref}$, as explained below.

It may be noted that it is equivalent for a bolometer to speak of its temperature or its resistance, since these two quantities are in fact directly related.

For this purpose, the value of the Select signal is adjusted to switch the first and second read switches 20 and 30 to their open state. At the same time, the value of the Calib signal is adjusted to switch the first calibration switch 44 to its closed state and to switch the second calibration switch 46 to its opened state.

The reference bolometer 26 is thus polarized by the injection therein of the current $I_{ref}$ and therefore undergoes a heating by Joule effect.

In the case of a material conventionally used to fabricate a bolometer, like amorphous silicon or a vanadium oxide for example, the resistance $R_b$ of the bolometer varies according to an Arrhenius law by the equation:

$$R_b = R_{ABS} \times \exp(Ea/KT) \quad (1)$$

where:
- Ea is an activation energy of the electrical conductivity of the bolometric material;
- $R_{ABS}$ is the value of the resistance of the reference bolometer when the temperature thereof tends toward infinity;
- K is the Boltzmann constant; and
- T is the absolute temperature to which the membrane of the bolometer is raised.

The coefficient of relative variation of temperature "TCR" of the resistance $R_b$ which is derived from equation (1) is expressed by:

$$TCR = -Ea/(KT^2)$$

This quantity is therefore negative, and the resistance $R_b$ decreases as the temperature increases.

Still at step 52, the level of the "Reset" control is also adjusted to switch the zero reset switch 18 to its closed state, thereby triggering the discharge of the capacitor 16, which is maintained in this state until the step 58 described below.

During a following step 54, a test is performed to determine whether the resistance $R_b$ of the reference bolometer 26 is substantially equal to a predefined resistance $R_{ref}$. If the result of this test is negative, the preheating of the reference bolometer 26 continues. If not, the test step 54 is terminated by stopping the preheating of the reference bolometer 26 by disconnecting the reference bolometer 26 from the current source (i.e., constant current source) 42. More particularly, the step 54 is carried out by the comparator 45.

According to Ohm's law, the voltage $V_b$ at the terminals of the reference bolometer 26 can be modeled according to the equation:

$$V_b = V_{DDA} - V_C = R_b \times I_{ref} \quad (2)$$

The comparator 45 then switches the third switch 48 to its open state, thereby disconnecting the current source 42 from the reference bolometer 26, when the voltage $V_{ref}$ is substantially equal to $V_C = VDDA - V_b$, that is, when $R_b$ satisfies the equation:

$$R_b = R_{ref} = \frac{VDDA - V_{ref}}{I_{ref}} \quad (3)$$

The preheating of the reference bolometer 26 is thus terminated.

It may be noted that the resistance $R_{ref}$ exhibited by the reference bolometer at the end of preheating is independent of the quantity of infrared radiation received by the reference bolometer. The reference bolometer 26 is thus desensitized.

It can in fact be shown that the temperature rise θ undergone by the reference bolometer 26 at the time of the disconnection from the current source 42 by the comparator 45 can be approximated to the first order by the equation:

$$\theta = \frac{1}{TCR} \times \ln\left(\frac{VDDA - V_{ref}}{R_0 \times I_{ref}}\right) \quad (4)$$

As may be observed, this temperature rise does not depend on the infrared radiation, but only on internal parameters of the bolometer and therefore the parameters of the control circuit 40, that is the current $I_{ref}$ and the voltage $V_{ref}$.

During a subsequent step 58, a reading of the imaging bolometer is initiated once the reference bolometer 26 is preheated and the capacitor 16 is discharged.

In step 58, the value of the "Calib" signal is adjusted to switch the first calibration switch 44 to its opened state and to switch the second calibration switch 46 to its closed state.

At the same time, the level of the "Reset" control is adjusted to open the switch 18 in order to initiate the integration of the current at the input (−) of the integrator 10.

The current $i_2$ flowing through the reference bolometer 26 is thus reproduced at point B. It is therefore subtracted, at the input of the integrator 10, from the current $i_1$ following through the imaging bolometer 12.

The step of reading the imaging bolometer thus terminates at 60, when the integration time $\Delta T_{int}$ has elapsed since the closure of the first and second read switches 20, 30.

The values of the current $I_{ref}$ and of the voltage $V_{ref}$ are selected during step 50 so that:
- the value of $V_{ref}$ is lower than the voltage $V_c$ of the terminal C during the initiation of the preheating of the reference bolometer. Thus, the switching condition of the comparator 45 is not initially satisfied. In the opposite case, the preheating of the reference bolometer 26 would be inhibited and the reference bolometer would thus be sensitive to the radiation;
- at the end of step 54, the resistance of the reference bolometers 26 is lower than that of the least resistive of the reference bolometers 26 of the compensation column 38, when the latter views a scene element having a temperature close (i.e., equal) to the upper limit of a predefined scene dynamic. Alternatively and advantageously, since the reference bolometers 26 are typically equivalent to the imaging bolometers 12, this value can be estimated from the reading of the preceding frame, or more broadly speaking, of a predefined number of previous frames. In fact, before step 54, the reference bolometers 26 are sensitive to the scene. In consequence, if $I_{ref}$ and $V_{ref}$ are poorly selected, the comparator 45 may instantaneously switch and immediately stop the heating of the reference bolometers 26. In other words, it is advisable to select the temperature θ according to the equation (4) higher than the maximum temperature that the scene can induce, that is, to impose a resistance lower than that which may be induced by the scene at its hottest point. Without this condition, the desensitization of the radiative stream is liable to be ineffective on one or more lines if the hottest zone of the image happens to scan the column(s) of reference pixels; and
- the heating time necessary for the resistance of the reference bolometer to reach the value $R_{ref}$ is shorter than an acceptable estimated fixed time considering the frame frequency. In fact, the discharge of the capacitor 16 is virtually immediate, compared to the heating time of the reference bolometers. Thus, the timing of the Reset and Select signals may be preserved.

A second preferred arrangement will now be explained in relation to FIGS. 3B and 5B, of an imaging bolometer, a read circuit thereof and a common mode rejection bolometer according to the invention, of the type called "compensation".

Figure 3B:
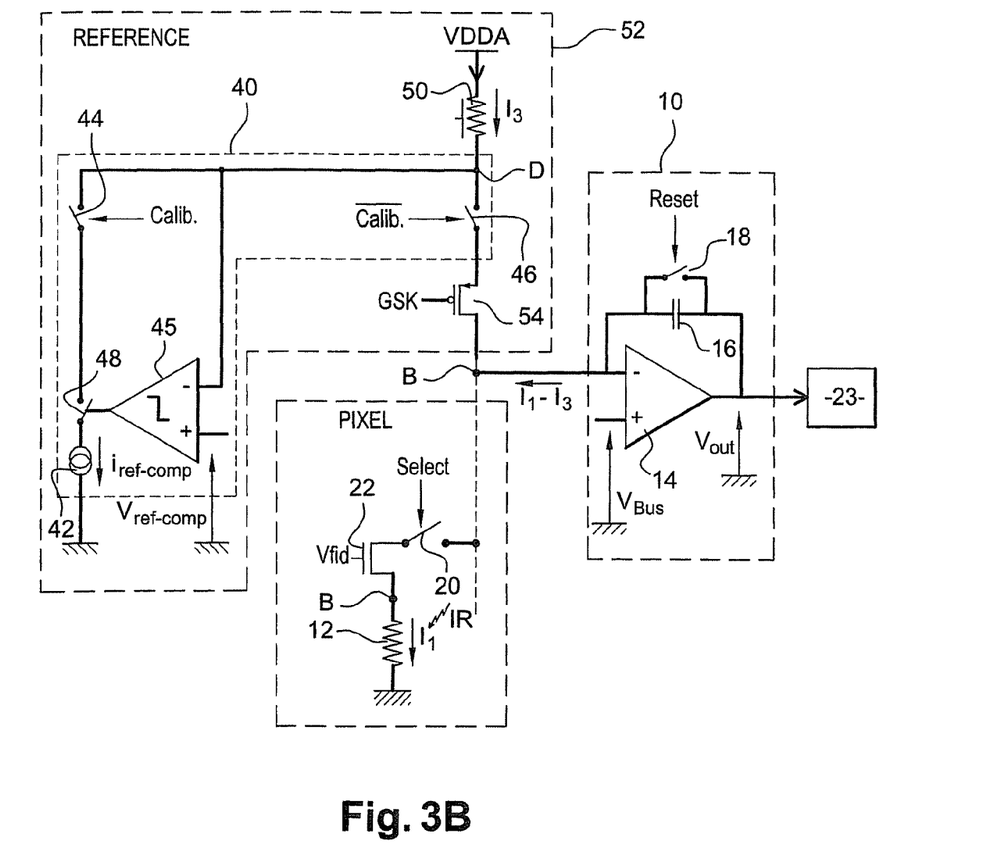
FIG. 3B is a schematic representation supplementing FIG. 2B with common mode compensation using the resistive compensation structure according to the invention.

As shown in FIG. 3B, a common mode rejection structure according to a second embodiment of the invention comprises a compensation line 52 in which a circuit 40 is provided for controlling the resistance of the compensation bolometer 50, identical and performing the same function as the one previously described. Each bolometer 50 may comprise one or more bolometric elements thermalized to the substrate so as to have a low thermal resistance compared to that of the imaging bolometers 12, but nevertheless non-negligible, that is, typically obtained by means of simplified methods, and in particular without the formation of a shield that is opaque to the radiation.

The circuit 40, injects, on the one hand, into the compensation bolometer 50 a current of a predefined strength $I_{ref\text{-}comp}$ when the first calibration switch 44 is in its closed state, and the second switch 46, arranged between a terminal D of the bolometer 50 and the source of the MOS transistor 54, is simultaneously in its opened state; on the other hand, the circuit 40, by means of the comparator 45, compares a voltage $V_D$ of the terminal D of the compensation bolometer 50 to a predefined reference voltage $V_{ref\text{-}comp}$; and finally, the comparator 45 maintains the third switch 48 in its closed state when the voltage $V_{ref\text{-}comp}$ is higher than the voltage $V_D$ at the terminal D, and switches the third switch 48 to its opened state when the voltage $V_{ref\text{-}comp}$ is substantially equal to the voltage $V_D$.

Figure 5B:
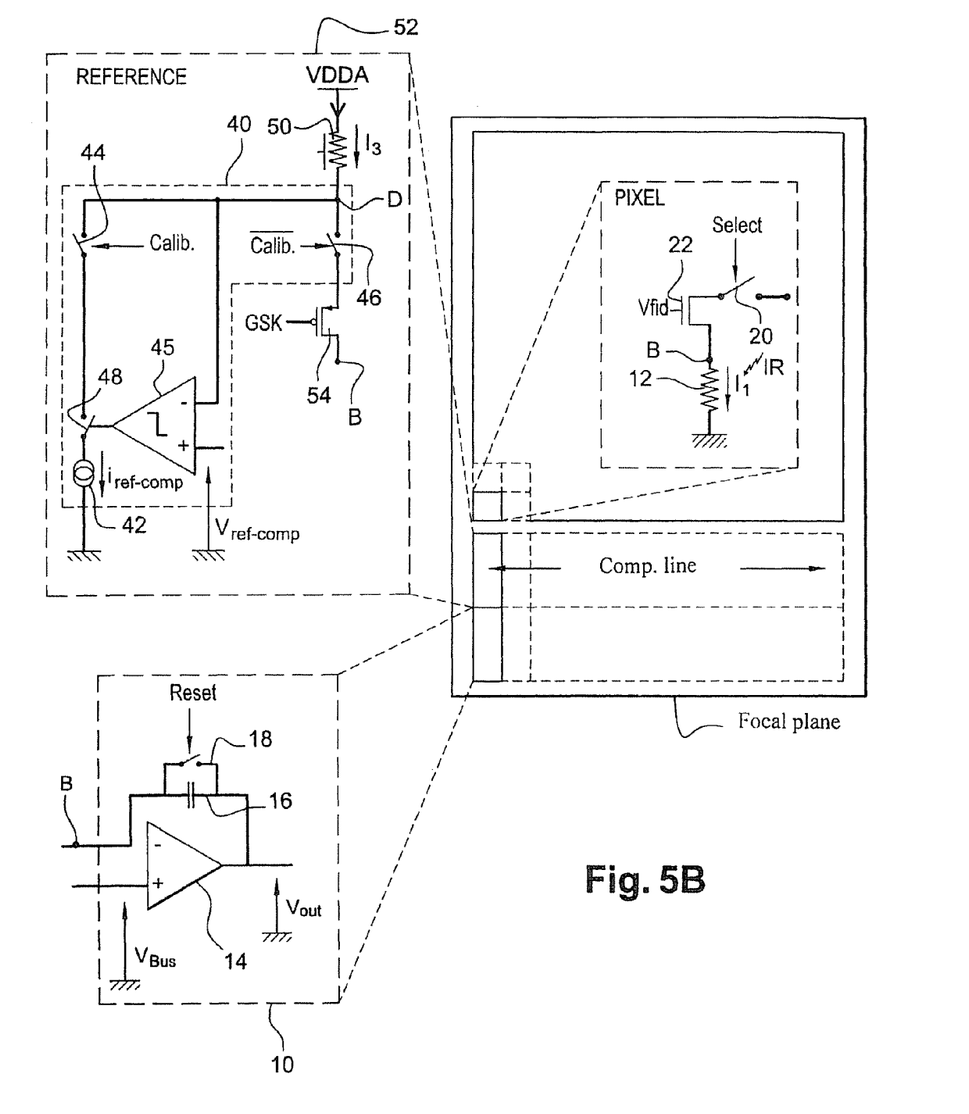
FIG. 5B is a schematic view of a bolometric detector according to the invention using compensation structures.

FIG. 5B shows a bolometric detector comprising an imaging matrix, read by a read circuit with common mode current rejection from compensation structures comprising the elements described above.

The method for reading the sensitive bolometer 12 used by the control circuit 40 can be described in exactly the same way as previously developed, via a sequence of identical steps 50 to 54, considering respectively "compensation" for "reference", $V_{ref\text{-}comp}$ for $V_{ref}$, $I_{ref\text{-}comp}$ for $I_{ref}$, "bolometer 50" for "bolometer 26", "terminal D" for "terminal C", $V_D$ for $V_C$, VSK for VDDA, $R_{comp}$ for $R_b$, $R_{comp}$ being the resistance of the compensation bolometer 50.

On completion of step 54, the resistance of the compensation bolometer 50 is raised to the predefined value $R_{comp\text{-}ref}$ equal to $V_{ref\text{-}comp}/I_{ref\text{-}comp}$.

The steps 58 and 60 are identical to what was previously described, with the only difference that the switch 20 is concerned for the selection of the bolometer to be read.

Before step 54, the reference bolometers 26 are slightly, but measurably, sensitive to the scene. In consequence, if $I_{ref\text{-}comp}$ and $V_{ref\text{-}comp}$ are poorly selected, the comparator 45 may instantaneously switch and immediately stop the heating of the compensation bolometers 50. In other words, it is advisable to select the temperature θ according to the equation (4) higher than the maximum temperature that the scene may induce on the compensation bolometers, that is, to impose a resistance lower than that which the scene can induce at its hottest point. Without this condition, the desensitization is liable to be ineffective on one or more columns, if the hottest zone of the image scans the line(s) of compensation bolometers.

In consequence, the values of the current $I_{reef\text{-}comp}$ and of the voltage $V_{reef\text{-}comp}$ are selected during step 50 so that:

the value of $V_{ref\text{-}comp}$ is lower than the voltage $V_D$ of the terminal D during the initiation of the preheating of the compensation bolometer. Thus, the switching condition of the comparator 45 is not initially satisfied. In the opposite case, the preheating of the compensation bolometer 50 would be inhibited and the compensation bolometer would not be desensitized to the radiation;

at the end of step 54, the resistance $R_{comp\text{-}ref}$ of the compensation bolometers 50 is lower than that of the least resistive of the compensation bolometers, when the latter sees a scene element displaying a temperature close to the upper limit of a predefined scene dynamic.

Alternatively, the values $I_{ref\text{-}comp}$ and $V_{ref\text{-}comp}$ are selected so that the resistance $R_{comp\text{-}ref}$ of the compensation bolometers 50 is lower than that of the least resistive of the compensation bolometers after the preceding frame. Advantageously, this value is extracted from the reading of the preceding frame, at the end of which a reading of the resistance of the compensation line will have been carried out. More broadly speaking, the result of the readings of the compensation line can be used in relation to a predefined number of prior frames; and the heating time required for the resistance of the compensation bolometer to reach the value $R_{comp\text{-}ref}$ is lower than an acceptable estimated fixed time considering the frequency of line reading. In fact, the discharge of the capacitor 16 is virtually immediate, compared to the heating time of the compensation bolometers. Thus, the timing of the Reset and Select signals can be preserved.

According to the invention, the following is obtained during a reading of the imaging bolometer 12, without resorting to a physical protective device against radiation issuing from the scene:

a desensitization of the common mode rejection bolometer with regard to the infrared radiation issuing from the scene. In fact, the read time is about fifty to one hundred microseconds, whereas the thermal time constant of an active or reference bolometer is about a few milliseconds. It can therefore be shown, that in the worst case, the variation in temperature of the reference bolometer due to the radiation issuing from the scene during a read cycle causes a variation typically lower than 1% of the current at the integrator input. In the case of the use of a partially thermalized compensation bolometer, the thermal time constant may be about the same as the integration time, and the desensitization is accordingly less effective in relative terms, although the sensitivity of these bolometers to the heat flux is already low by construction, so that the result of the invention is satisfactory insofar as the variation in current at the integrated input becomes negligible;

a lower manufacturing cost because the circuit for controlling the resistance of the common mode rejection bolometer consists directly of the read circuit, economizing the production of the shield for desensitization to the radiation, necessary or at least useful for the common mode rejection bolometers of the prior art; and a substantial attenuation of the effects of the natural dispersion of the resistances of the common mode rejection bolometers, due to the fact that the resistance of these elements is imposed at a common value for the entire column of reference bolometers, or for the entire line of compensation bolometers.

A particular embodiment of the invention has been described.

As an alternative, the current source is controllable. For example, a variable current profile during the preheating time can be previously determined in order to further optimize this time.

As a further alternative, the selection of the values $V_{ref}$ and $I_{ref}$, or $I_{ref\text{-}comp}$ and $V_{ref\text{-}comp}$ is made so as to impose, at the end of the conditioning of the common mode rejection bolometers to a uniform temperature prior to the reading, a resistance lower by a predefined absolute or relative quantity than the mean value at thermal equilibrium of the resistances $R_b$ or $R_{comp}$ when the circuit for controlling the resistance of the common mode rejection bolometers is not activated.

The following discussion clarifies the meaning of the term "predefined" for the case of the use of reference or compensation structures.

In fact, the equilibrium temperature rise, or what amounts to the same thing, the resistance at thermal equilibrium of a reference or compensation bolometer under the effect of the maximum radiation that the detector is intended to detect, that is when it views a scene whereof the temperature is close to the upper limit of the anticipated scene dynamic, is easily attainable from its constructive features, in particular its thermal resistance, the effective area of its sensitive membrane and its integrated absorption coefficient in the spectral band to which it is sensitive. This resistance is also directly derivable from the calibration of a representative detector placed in front of a black body heated to said temperature.

It therefore suffices to impose the resistance value $R_{ref}$ or $R_{comp-ref}$ obtained in the previously indicated conditions, by means of the invention and the selection of the appropriate values of $V_{ref}$ and $I_{ref}$ (or more simply a single of these two quantities, if the other is correctly dimensioned a priori) interrelated by the equation $V_{ref}/I_{ref}=R_{ref}$, or $V_{ref-comp}/I_{ref-comp}=R_{comp-ref}$.

Optionally, it may be useful to supplement the decrease in resistance defined by the desensitization to the anticipated scene dynamic according to the preceding indications, by an additional decrease intended to inhibit the effect of the natural dispersions of the common mode rejection resistances.

To provide a useful order of magnitude and to clarify this statement, to obtain the desensitization of the common mode rejection structures to a scene heated to 100° C. above the temperature of the focal plane, it is necessary to heat the reference bolometers before integration by about 2° C. compared to their equilibrium temperature when the detector views a scene at ambient temperature and in the absence of electrical thermalization according to the invention. This is equivalent to decreasing their resistance by about 4% considering the common bolometric materials in the field.

If the natural dispersion of the reference resistances is also about 1%, which represents a worst case, it is necessary to reduce the reference resistances by a total of about 5% by means of the invention before the integration phase, to eliminate the spatially dispersive effects of this natural distribution of the reference resistances on the shaping of the signal, regardless of the scene temperature up to 100° C. Above this temperature, the desensitization is only effective at best on part of the lines of the detector and the natural dispersion of common mode rejection progressively reappears.

As to this selection of the values $I_{ref-comp}$ and $V_{ref-comp}$ to be applied to the compensation bolometers, a substantially smaller difference in resistance than in the preceding case will be effective to desensitize the common mode rejection over an identical scene dynamic.

In fact, for a compensation bolometer that is for example 100 times less sensitive to the radiation than the active bolometers, a prior electrical heating of the integration phase by about 20 mK is adequate.

Contrary to the case previously described, it is rather the natural dispersion of the resistances $R_{comp}$, independently of the heat flux, which defines the decrease in resistance to be imposed before integration, to ensure that all the columns are desensitized. In fact, if, as previously, a spatial dispersion of about 1% on $R_{comp}$, is adopted, the prior heating must lead to at least a 1% decrease in resistance, that is, amount to about 1° C. Such a temperature rise is obtainable for so-called thermalized structures of the current technique, in the space of a few microseconds, compatible with the usual chronology of the operation of the detector, using the voltages $V_{ref-comp}$ and currents $I_{ref-comp}$ that are easily obtainable in a standard circuitry of the field.

It is this relative or absolute difference, considered on the whole, in a manner that is perhaps less refined than previously suggested using estimations deduced from the image signal, or specific to the compensation bolometers, but advantageously applied simply because independently of the current scene, that is referred to as the "predefined difference".

The comments previously produced in support of the alternatives proposed apply nominally and exactly to a detector maintained at a fixed focal plane temperature, for example regulated by a Peltier effect module (TEC) or by a regulated heating of the read circuit.

If the temperature of the focal plane is expected to vary, as occurs increasingly widely for economic reasons, it is typically essential to provide a concomitant and relevant variation in the thermalization conditions of the common mode rejection bolometers, in order to obtain a satisfactory result for desensitization of the heat flux of the scene, at any temperature in the operational range of the detector.

For this purpose, an electronic circuitry of a similar type can be provided for example, typically comprising at least one element intended to control the voltage $V_{ref}$ (resp. $V_{ref-comp}$) or the current $I_{ref}$ (resp. $I_{ref-comp}$) adequately as a function of the temperature of the focal plane (of the substrate supporting the read circuit). A typical element is for example an operational amplifier fed back by a bolometer that is thermalized by construction (of the compensation type, and disposed outside the area related to the scene), said bolometer defining the gain of the amplifier in proportion to its resistance, that is a representative law of the temperature of the substrate of the read circuit.

Another arrangement for this purpose of functional control of the focal plane temperature is to supply to the processing unit 28 a measurement of the focal plane temperature, for example by means of a probe formed at the substrate surface, said processing unit numerically making the correction or corrections to be applied to the voltage and/or current sources controlling the common mode rejection bolometers.

In this way, the considerations expressed throughout the document, implicitly for a particular focal plane temperature, are applicable to a wide temperature range in the neighborhood of the ambient temperature.

Similarly, as an alternative, the imaging bolometer and the common mode rejection bolometer are arranged in a Wheatstone bridge as described in document US 2003/0146383.

The present invention has an application in the field of image sensors with bolometric detection, regardless of the detection frequency band or the type of bolometric material used to manufacture the imaging and reference bolometers, such as for example amorphous silicon (a-Si), vanadium oxide (Vox), a metal (Ti).

Owing to its capacity to adapt to various operating temperatures of an image sensor with bolometric detection, the invention also applies equally well to thermally regulated sensors and to sensors operating at a variable focal plane temperature (commonly referred to by the expression "TEC-LESS"), and whether or not a shutter has been provided in combination with the optics.

The invention claimed is:

1. A device for detecting an electromagnetic radiation from a scene comprising a resistive imaging bolometer sensitive to the electromagnetic radiation to be detected, intended to be connected electrically to a signal shaping circuit, and a resistive common mode rejection bolometer comprising first and second terminals, said first terminal connected to a constant voltage source and said second terminal associated electrically with the imaging bolometer, so that the current flowing through the common mode rejection bolometer is subtracted from the current flowing through the imaging bolometer, wherein said device includes means for controlling a resistance of the common mode rejection bolometer by injecting current therein, and
wherein the means for controlling the resistance of the common mode rejection bolometer comprises:
a current source suitable for generating a predefined reference current in the common mode rejection bolometer,
means for connecting the current source to the common mode rejection bolometer so that the predefined reference current flows in the common mode rejection bolometer, and
means for disconnecting the current source from the common mode rejection bolometer when a voltage at the second terminal of the common mode rejection bolometer is substantially equal to a predefined reference voltage, thereby setting the resistance of the common mode rejection bolometer to the ratio of the value of the voltage across the common mode rejection bolometer to the value of the predefined reference current at the instant of disconnection from the current source.

2. The device for detecting an infrared radiation as claimed in claim 1, wherein the reference voltage is set at a higher value than the voltage at the second terminal of the common mode rejection bolometer during an activation of the current injecting means.

3. The device for detecting an infrared radiation as claimed in claim 1, wherein the common mode rejection bolometer is a reference bolometer, and wherein said device comprises a current mirror suitable for being electrically connected on a first branch to a terminal of the imaging bolometer, and on a second branch to a terminal of the reference bolometer.

4. The device as claimed in claim 1, wherein the common mode rejection bolometer is a compensation bolometer.

5. The device as claimed in claim 1, wherein the control means are suitable for fixing the resistance of the common mode rejection bolometer to a reference resistance depending on the temperature of a substrate above which the imaging bolometer is formed.

6. The device for detecting an infrared radiation as claimed in claim 1, wherein the imaging bolometer and the common mode rejection bolometer are arranged in a Wheatstone bridge.

7. A system for detecting an electromagnetic radiation comprising a matrix of at least one line of devices each comprising:
a resistive imaging bolometer sensitive to the radiation and a resistive common mode rejection bolometer associated electrically with the imaging bolometer so that a current flowing through the common mode rejection bolometer is subtracted from a current flowing through the imaging bolometer; and
a signal shaping circuit suitable for being connected electrically to the imaging bolometer,
wherein the devices are according to claim 1.

8. The system for detecting an infrared radiation as claimed in claim 7, wherein the means for controlling the resistance of the common mode rejection bolometer are suitable for adjusting the common mode rejection bolometer resistance to a value independent of the scene.

9. The system for detecting an infrared radiation as claimed in claim 7, wherein the signal shaping circuit is suitable for being initialized before a reading of the imaging bolometer, and wherein the means for controlling the resistance of the common mode rejection bolometer are suitable for adjusting said resistance during the initialization of the signal shaping circuit.

10. A method for reading a variation in resistance of a resistive imaging bolometer of a matrix of bolometers constituting a system for detecting electromagnetic radiation, wherein said system comprises a common mode rejection bolometer for each row or column of the matrix of bolometers and wherein said method consists of:
circulating a common mode current of the matrix of bolometers in a common mode rejection bolometer,
generating a current difference between currents flowing in the imaging bolometers and currents flowing in the common mode rejection bolometers,
shaping the signal relative to an imaging bolometer according to the current difference,
wherein it further consists, prior to the step of circulating the common mode current in the common mode rejection bolometer, a setting of the resistance of the common mode rejection bolometer at a value lower than that of all of the common mode rejection bolometers when they are exposed to a scene having a temperature equal to an upper limit temperature of a predefined scene dynamic.

* * * * *